United States Patent Office 3,711,483
Patented Jan. 16, 1973

3,711,483
1,3,6-SUBSTITUTED 5-HALOURACILS
Shigeo Senda, 30 Nikkocho-2-chome, Gifu, Japan
No Drawing. Filed Apr. 16, 1970, Ser. No. 29,241
Claims priority, application Japan, Apr. 19, 1969,
44/30,531; May 29, 1969, 44/42,428
Int. Cl. C07d 51/30
U.S. Cl. 260—260                                    8 Claims

ABSTRACT OF THE DISCLOSURE 1,3,6-substituted 5-halouracils of the formula

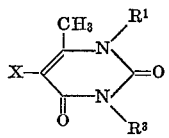

wherein X is halogen, one of $R^1$ and $R^3$ is saturated or unsaturated lower alkyl and the other of $R^1$ and $R^3$ is

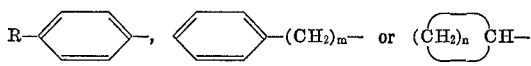

wherein R is hydrogen, lower alkyl, lower alkoxy, or halogen; $m$ is 1 or 2; and $n$ is an integer of 4 or 5; provided that $R^3$ is other than cyclohexyl. These compounds are useful as intermediates in the production of the corresponding 5-amino derivatives which are pharmaceutical agents. The 5-halouracils are prepared by halogenating 1,3,6-substituted uracils of the formula

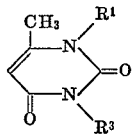

wherein one of $A^1$ and $A^3$ is hydrogen and the other of $A^1$ and $A^3$ is

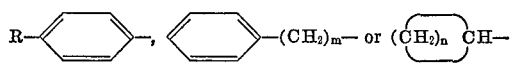

provided that $A^3$ is other than cyclohexyl.

---

This invention relates to novel 1,3,6-substituted 5-halouracils and to a method for their production.

The novel 1,3,6-substituted 5-halouracils of the invention have the following general formula:

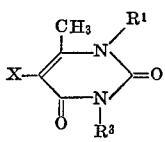

wherein X is halogen, one of $R^1$ and $R^3$ is

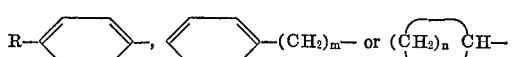

and the other of $R^1$ and $R^3$ is saturated or unsaturated lower alkyl, R is hydrogen, lower alkyl, lower alkoxy, or halogen; $m$ is 1 or 2; and $n$ is 4 or 5; provided that $R^3$ is other than cyclohexyl.

In this invention, the halogen may be, for example, chlorine, bromine, or iodine; the saturated or unsaturated lower alkyl may be, for example, methyl, ethyl, n-propyl, iso-propyl, n-butyl, iso-butyl, sec-butyl, tert-butyl, pentyl, hexyl, or allyl; and the lower alkoxy may be, for example, methoxy or ethoxy. The terms "lower alkyl" and "lower alkoxy" are intended to include alkyl moieties of 1–6 carbon atoms.

The novel compounds of the invention afford a series of compounds exhibiting analgesic, antipyretic, and antiinflammatory action when the halogen atom is substituted by ammonia or monoalkylamines, dialkylamines or cyclic amines. Thus the compounds of the present invention are useful as intermediates for the manufacture of the pharmaceutical agents disclosed in my copending application Ser. No. 29,240, filed April 16, 1970, entitled "1,3,6-Substituted 5-Aminouracil and Derivatives Thereof and Their Production."

The novel compounds of the invention can be manufactured, for example, by the reaction of 1,3,6-substituted uracils of the formula

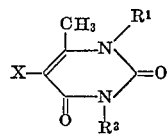

(where $R^1$ and $R^3$ are the same as above) with a halogenation agent so that a halogen atom is introduced into the 5-position.

All conventional halogenation agents are advantageously used in this method; such as free halogen, a solution of free halogen (in, for example, acetic acid), hydrogen halide (or its salt) with hypohalite (or its salt), phosphorus halide, sulfuryl halide, N-halosuccinic imide, N-haloacetamide, etc. The use of free halogen is, however, most preferred. In the case of iodination, addition of oxidizers, such as nitric acid, hydrogen peroxide, etc., to the halogenation agent is advantageous.

Any kind of solvent may be used in the halogenation reaction, provided that said solvent does not inhibit the halogenation. Examples of such solvents are acetic acid, acetic anhydride, chloroform, carbon tetrachloride, benzene, toluene, etc. When free halogen is used as a halogenation agent, the use of glacial acetic acid, chloroform, or methanol is desired. The halogenation reaction is, in general, carried out with or without cooling, or at room temperature, or with heating in order to accelerate the reaction. In the halogenation reaction, such acid removers as alkali carbonate, alkali bicarbonate, alkali hydroxide, etc. may be added, if desired, to remove the hydrogen halide produced during the reaction. Thus, according to the kind of halogenation agent used, halogens such as chlorine, bromine, iodine, etc. are introduced at the 5-position of the uracil nucleus, and the compounds of the invention are obtained.

This invention is illustrated by the following examples.

EXAMPLE 1

5-bromo-1,6-dimethyl-3-phenyluracil 21 g. of 1,6-dimethyl-3-phenyluracil was dissolved in 80 ml. of acetic acid, and a solution of 15 g. of bromine in 30 ml. of acetic acid was gradually added dropwise with stirring. After addition of 400 ml. of water, the reaction mixture was allowed to stand, and the separated mass was collected, washed with water, and recrystallized from methanol to give colorless prisms, M.P. 195–8° C.

Analysis.—Calculated for $C_{12}H_{11}O_2N_2Br$ (percent): C, 49.46; H, 3.73; N, 9.49. Found (percent): C, 49.16; H, 4.05; N, 9.27.

EXAMPLE 2

5-chloro-1,6-dimethyl-3-phenyluracil

Concentrated hydrochloric acid (2.2 ml.) was added to a suspension of 6.7 g. of 1,6-dimethyl-3-phenyluracil in acetic anhydride, and then 11 ml. of 10% aqueous solution of sodium hypochlorite was gradually added thereto. The reaction mixture was allowed to stand for 3 hours while cooling to below 60° C. when the reaction solution became hot. The reaction solution was poured over 300 g. of ice water, and the separated mass was collected, washed with water, and recrystallized from ligroin to give colorless needles, M.P. 156–8° C.

Analysis.—Calculated for $C_{12}H_{11}O_2N_2Cl$ (percent): C, 57.50; H, 4.43; N, 11.16. Found (percent): C, 57.22; H, 4.41; N, 10.99.

EXAMPLE 3

5-iodo-1,6-dimethyl-3-phenyluracil 1,6-dimethyl-3-phenyluracil (6.6 g.) was dissolved in 200 ml. of glacial acetic acid. First, 4 g. of iodine were added to the solution and then 10–15 drops of concentrated nitric acid were gradually added during about 2 hours. After the color of iodine disappeared, 500 ml. of water were added with stirring and the mixture was allowed to stand. The separated mass was collected, washed with water, and recrystallized from methanol to give colorless needles, M.P. 233–4° C.

Analysis.—Calculated for $C_{12}H_{11}O_2N_2I$ (percent): C, 42.10; H, 3.24; N, 8.18. Found (percent): C, 42.12; H, 3.33; N, 8.09.

Similarly prepared were the following compounds in accordance with the method disclosed in Examples 1, 2 and 3.

(e.g. sodium hydroxide, potassium hydroxide, calcium hydroxide, sodium carbonate, sodium bicarbonate, etc.) and organic bases (e.g. pyridine, dimethylaniline, etc.). It is, however, preferred to carry out the reaction in water or in alcohol using alkali hydroxide or alkali carbonate, in general. Reactions may proceed even when kept at room temperature provided that the reaction is exothermic but, in most cases, it is recommended to heat the reaction mass at a temperature of about 90° to about 110° C., preferably about 100° C., up to several hours.

This invention is further illustrated by the following examples:

EXAMPLE 22

5-bromo-1-allyl-6-methyl-3-phenyluracil

To 30 ml. of 10% aqueous sodium hydroxide solution were added 15 g. of 5-bromo-6-methyl-3-phenyluracil, 8 g. of allyl bromide, and 30 ml. of ethanol, and the mixture was heated on a steam bath for 5 hours. Ethanol was removed from the mixture, and in vacuo the residue collected, washed with water, and recrystallized from ethanol-water to give colorless needles, M.P. 136° C.

Analysis.—Calculated for $C_{14}H_{13}O_2N_2Br$ (percent): C, 52.38; H, 4.08; N, 8.72. Found (percent): C, 52.56; H, 4.15; N, 8.51.

| Example | R¹ | R³ | X | Recrystn. solvent | Appearance | M.P. (° C.) |
|---|---|---|---|---|---|---|
| 4 | Ethyl | Phenyl | Br | Methanol | Needles | 165 |
| 5 | Butyl | do | Br | Ligroin | do | 111 |
| 6 | Methyl | Benzyl | Br | Methanol | Prisms | 135 |
| 7 | do | Phenethyl | Br | do | Needles | 117 |
| 8 | Allyl | Phenyl | Br | Ethanol-H₂O | do | 136 |
| 9 | Phenyl | Methyl | Br | Methanol | do | 238 |
| 10 | do | Ethyl | Br | do | Flakes | 207–9 |
| 11 | do | Isopropyl | Br | do | Needles | 230 |
| 12 | do | Butyl | Br | Methanol-H₂O | Prisms | 127 |
| 13 | do | Allyl | Br | Ethanol | do | 175 |
| 14 | p-Tolyl | Methyl | Br | Methanol | Needles | 245 |
| 15 | p-Methoxyphenyl | do | Br | do | do | 209 |
| 16 | p-Chlorophenyl | do | Br | do | do | 269 |
| 17 | Phenyl | do | Cl | do | do | 232 |
| 18 | do | do | I | do | do | 216 |
| 19 | Methyl | Cyclopentyl | Br | do | do | 174 |
| 20 | Cyclohexyl | Methyl | Br | do | do | 240 |
| 21 | Cyclopentyl | do | Br | Methanol-H₂O | do | 158 |

Novel compounds according to this invention may also be manufactured by alkylating a 5-halo-6-methyluracil derivative having the formula

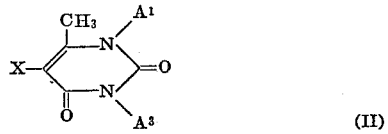

(II)

in which X is halogen and one of A¹ and A³ is hydrogen and the other of A¹ and A³ is

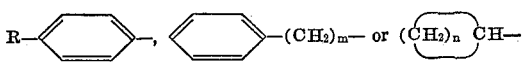

wherein R, m and n are as defined above; provided that A³ is other than cyclohexyl.

In carrying out the alkylation reaction, various kinds of alkylating agents may be used. For example, it is preferred to use various kinds of saturated or unsaturated alkyl halides as well as saturated or unsaturated alkyl sulfates. Examples of such alkylating agents are allyl bromide, isopropyl bromide, butyl bromide, dimethyl sulfate, diethyl sulfate, etc. They are, of course, given for the purpose of illustration only and the present invention is not limited to the use of the above alkylating agents only. The alkyl moiety of the alkylation agent is saturated or unsaturated lower alkyl.

In carrying out the alkylation reaction, it is preferred to use water as a solvent or organic solvents, such as methanol, ethanol, acetone, or benzene, and to use simultaneously such condensation agents as inorganic bases

EXAMPLE 23

5-bromo-1,6-dimethyl-3-phenyluracil

To 80 ml. of 5% aqueous sodium hydroxide solution was added 25 g. of 5-bromo-6-methyl-3-phenyluracil. 14 g. of dimethyl sulfate were gradually added to the mixture dropwise with stirring. The mixture was allowed to react at room temperature for 2 hours and was then heated on a steam bath for 30 minutes, after which a precipitate was collected, washed with water, and recrystallized from methanol to give colorless prisms, M.P. 198° C.

Analysis.—Calculated for $C_{12}H_{11}O_2N_2Br$ (percent): C, 48.82; H, 3.76; N, 9.47. Found (percent): C. 48.80; H, 3.86; N, 9.22.

EXAMPLE 24

5-bromo-1-butyl-6-methyl-3-phenyluracil

To 30 ml. of 10% aqueous sodium hydroxide solution was added 15 g. of 5-bromo - 6 - methyl-3-phenyluracil. The mixture was stirred on a steam bath for 5 hours together with 10 g. of butyl bromide and 60 ml. of ethanol. Ethanol was removed in vacuo, and the residue collected, washed with water, and recrystallized from ligroin to give colorless needles, M.P. 111° C.

Analysis.—Calculated for $C_{15}H_{17}O_2N_2Br$ (percent): C, 53.45; H, 5.09; N, 8.31. Found (percent): C, 52.91; H, 5.00; N, 8.16.

EXAMPLE 25

5-bromo-3-isopropyl-6-methyl-1-phenyluracil

To 30 ml. of 10% aqueous sodium hydroxide solution was added 15 g. of 5-bromo-6-methyl-1-phenyluracil. The mixture was stirred for 5 hours on a steam bath together with 10 g. of isopropyl bromide and 60 ml. of ethanol. Ethanol was removed in vacuo, and the residue collected, washed with water, and recrystallized from methanol to give colorless needles, M.P. 230° C.

*Analysis.*—Calculated for $C_{14}H_{15}O_2N_2Br$ (percent): C, 52.08; H, 4.68; N, 8.67. Found (percent): C, 52.26; H, 4.70; N, 8.41.

Using the procedures of Examples 22–25, the following compounds were prepared:

| Example | $R^1$ | $R^3$ | X | Recrystn. solvent | Appearance | M.P. (° C.) |
|---|---|---|---|---|---|---|
| 26 | Ethyl | Phenyl | Br | Methanol | Needles | 165 |
| 27 | Methyl | do | Cl | Ligroin | do | 156-8 |
| 28 | do | do | I | Methanol | do | 233-4 |
| 29 | do | Benzyl | Br | do | Prisms | 135 |
| 30 | do | Phenethyl | Br | do | Needles | 117 |
| 31 | Phenyl | Methyl | Br | do | do | 238 |
| 32 | do | do | Cl | do | do | 232 |
| 33 | do | do | I | do | do | 216 |
| 34 | do | Ethyl | Br | do | Flakes | 207-9 |
| 35 | do | Butyl | Br | Methanol-$H_2O$ | Prisms | 127 |
| 36 | do | Allyl | Br | Ethanol | do | 175 |
| 37 | p-Tolyl | Methyl | Br | Methanol | Needles | 245 |
| 38 | p-Methoxyphenyl | do | Br | do | do | 209 |
| 39 | p-Chlorophenyl | do | Br | do | do | 259 |
| 40 | Methyl | Cyclopentyl | Br | do | do | 174 |
| 41 | Cyclohexyl | Methyl | Br | do | do | 240 |
| 42 | Cyclopentyl | do | Br | Methanol-$H_2O$ | do | 158 |

The 1,3,6-substituted uracils of the formula

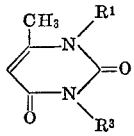

which are halogenated to form the 5-halouracils of the present invention can be prepared by reacting ethyl acetoacetate or diketene with a urea of the formula $R'NHCONHR^3$, where $R^1$ and $R^3$ are as defined above.

What is claimed is:

1. A compound of the formula:

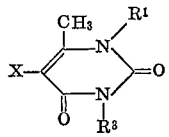

wherein X is halogen; $R^3$ is saturated or unsaturated lower alkyl and $R^1$ is

wherein R is hydrogen, lower alkyl, lower alkoxy, or halogen provided that when R is hydrogen or chloro and X is chloro or bromo, $R^3$ is other than methyl.

2. The compound according to claim 1, being 5-bromo-3-ethyl-6-methyl-1-phenyluracil.

3. The compound according to claim 1, being 5-bromo-3-isopropyl-6-methyl-1-phenyluracil.

4. The compound according to claim 1, being 5-bromo-3-butyl-6-methyl-1-phenyluracil.

5. The compound according to claim 1, being 5-bromo-3-allyl-6-methyl-1-phenyluracil.

6. The compound according to claim 1, being 5-bromo-3,6-dimethyl-1-p-tolyluracil.

7. The compound according to claim 1, being 5-bromo-3,6-dimethyl-1-p-methoxyphenyluracil.

8. The compound according to claim 1, being 5-iodo-3,6-dimethyl-1-phenyluracil.

References Cited

UNITED STATES PATENTS 3,235,363  2/1966  Luckenbaugh et al. __ 260—260

FOREIGN PATENTS 106,253  4/1967  Denmark _____ 260—260

ALTON D. ROLLINS, Primary Examiner

A. T. TIGHE, Assistant Examiner